United States Patent [19]

Pizão

[11] Patent Number: 5,538,037
[45] Date of Patent: Jul. 23, 1996

[54] DEVICE TO INDICATE OPERATING STATE OF A LINEAR ACTUATION VALVE

[75] Inventor: Márcio R. Pizão, Campinas, Brazil

[73] Assignee: Petroleo Brasileiro S.A. - Petrobras, Rio de Janeiro, Brazil

[21] Appl. No.: 331,197

[22] Filed: Oct. 28, 1994

[30] Foreign Application Priority Data

Oct. 29, 1993 [BR] Brazil ................................. 9304416-0

[51] Int. Cl.$^6$ .................................................. F16K 37/00
[52] U.S. Cl. .......................... 137/556; 137/554; 137/556.3
[58] Field of Search ................................. 137/554, 556, 137/556.3

[56] References Cited

U.S. PATENT DOCUMENTS

| | | | |
|---|---|---|---|
| 1,799,143 | 4/1931 | Bailey | 137/556 |
| 2,584,847 | 2/1952 | Dahl | 137/556.3 |
| 3,390,943 | 7/1968 | Myers | 137/556.3 |
| 4,198,030 | 4/1980 | Jackson et al. | 137/554 |
| 4,721,131 | 1/1988 | Ciordinik et al. | 137/554 |
| 4,967,792 | 11/1990 | Magee | 137/554 |

*Primary Examiner*—A. Michael Chambers
*Attorney, Agent, or Firm*—Sughrue, Mion, Zinn, Macpeak & Seas

[57] ABSTRACT

A device 3 for indicating the operating state of a linear actuation valve (5) comprises a mounting plate (9) having a rectilinear slot (11) therein for slidably receiving a perpendicularly extending follower stem (6) fixed to a follower nut (4). The nut (4) is threaded on to the exterior of a sleeve (7) which is mounted for conjoint rotation with the hub of a hand wheel (2) of the linear actuation valve. Engagement of the follower stem (6) with the slot (9) prevents rotation of the nut (4) and provokes it to move axially relative to the sleeve (7).

The mounting plate (9) also includes means for fixing sensors (15) and (16) to the plate for detecting arrival of the follower stem (6) moving along the slot in either of two positions to be detected.

5 Claims, 2 Drawing Sheets

5,538,037

DEVICE TO INDICATE OPERATING STATE OF A LINEAR ACTUATION VALVE

FIELD OF THE INVENTION

This invention relates to a device for the remote sensing of the operating state of a linear actuation valve, to show whether the valve is fully open or fully shut.

BACKGROUND OF THE INVENTION

This invention refers to a device which may be fitted, for example, between the valve wheel and the bonnet of a linear actuation valve, and is provided with sensors which will indicate whether valve is fully open or fully shut.

STATE OF THE ART

Owing to the ever-increasing growth of remote control systems meant to operate some kind of process, the need has been felt for various kinds of devices to indicate fundamental parameters for different sorts of equipment. As regards manually operated linear actuation shut-off or block valves, which valves are widely used in the flow of liquids, it is becoming important that the operating state of the valve— whether open or shut—be known at a remote location.

Various ways of dealing with this problem have been put forward. EP-A-369918 of Jan. 29, 1994 teaches the use of two coils concentrically fitted to the valve shutter, the first coil inducing a voltage in the second coil, in a direct relationship to the position of the valve shutter so as to enable the state of the valve to be correctly indicated.

This arrangement works well but one of its chief drawbacks is that there are a lot of mechanical and electrical parts, the manufacturing cost is high, and the large number of electrical parts make it more likely to break down.

U.S. Pat. No. 4,967,792 of Jan. 29, 1990 brings in the use of small magnetized parts fixed to the valve stem, together with a device fitted between the bonnet and the valve wheel and able to detect the magnetic field generated about such small parts when they pass close to sensors lying within the device. A signal is thereby generated to indicate the operating state of the valve, that is, whether it is open or shut.

This arrangement works well but is hampered by the fact that the valve stem has to be drilled, thereby diminishing the valve stem cross-sectional area, which may affect strength of stem at such points.

In contrast to this state of the art, the invention herewith applied for enables the operating state of a linear actuation valve to be easily indicated without having to make great changes into any of the original parts of the valve.

SUMMARY OF THE INVENTION

The object of the invention is to provide a device fitted between the bonnet and the wheel of a linear actuation valve so that the operating state, of said valve, i.e., whether open or shut, may be ascertained.

The device consists of a sleeve threaded on its outside, which is fitted to the hub of the linear actuation valve wheel together with a part screwed on to the sleeve, known as a follower, which has a stem fitted to its outside, referred to as follower stem; plus a plate fixed to the bonnet in which there is an oblong slot, in which the follower stem will slide, and two other groups of oblong slots into which sensors can be fitted to sense the approach of follower stem as it moves up and down, to remotely inform when valve is fully open or fully shut.

BRIEF DESCRIPTION OF THE DRAWINGS

Other objects and advantages of the invention will be more readily perceived from the following detailed description given, merely by way of example, with reference to the accompanying drawings, in which.

DETAILED DESCRIPTION OF THE INVENTION

The ever growing move towards automation within industry in general has brought about the rise of technologies to deal with the various problems that emerge. As regards the plants for processing of fluids, a greater number of devices have been developed to control and supervise such processes, especially to supervise the progress so as to centralize information at one single spot for enabling work to be done more efficiently. For such tasks to be properly carried out much information on supervision and central parameters for processes is collected at several points and directed to an operation supervision and control center.

A basic kind of information needed for such plants to operate properly is the operating state of shut-off or block valves, i.e. whether they are open or shut. This sort of information can be is easily obtained from valves that have some kind of operating mechanism, whether they are control valves or just power operated block valves. However, manually-operated block valves require some sort of device adapted to ensure that their operating state can be sensed remotely.

This invention is meant to offer an easy and cheap answer for such problem.

Figure 3:
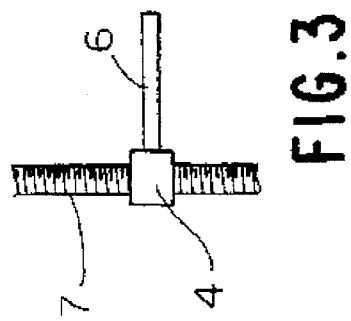
FIG. 3 is a side view, as a detail of FIG. 2, showing details of the threaded sleeve and the follower.
Figure 2:
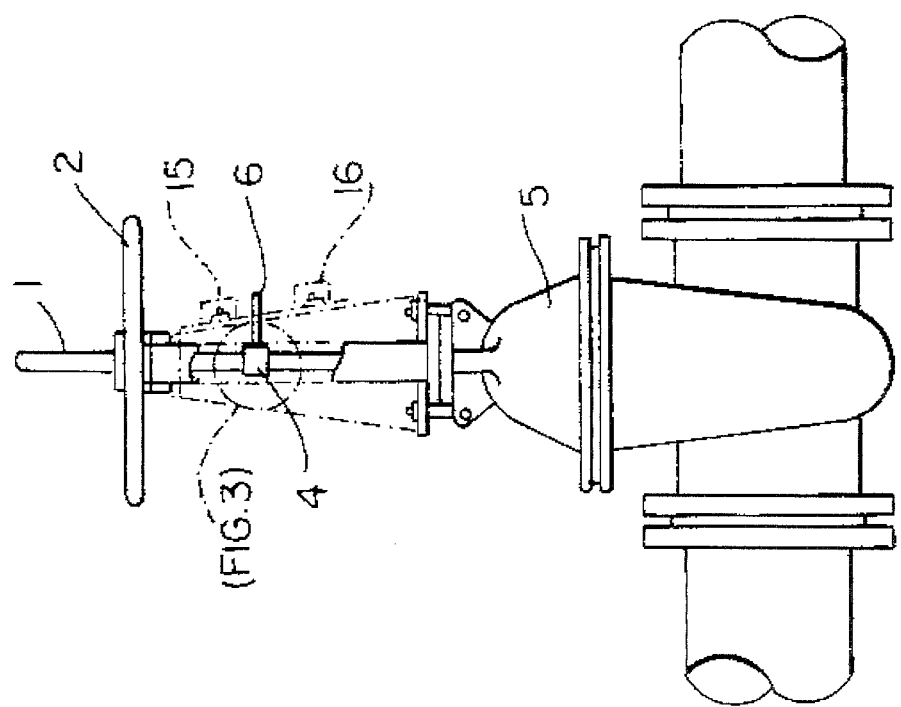
FIG. 2 is a side view of the linear actuation valve with the device of this invention.
Figure 1:
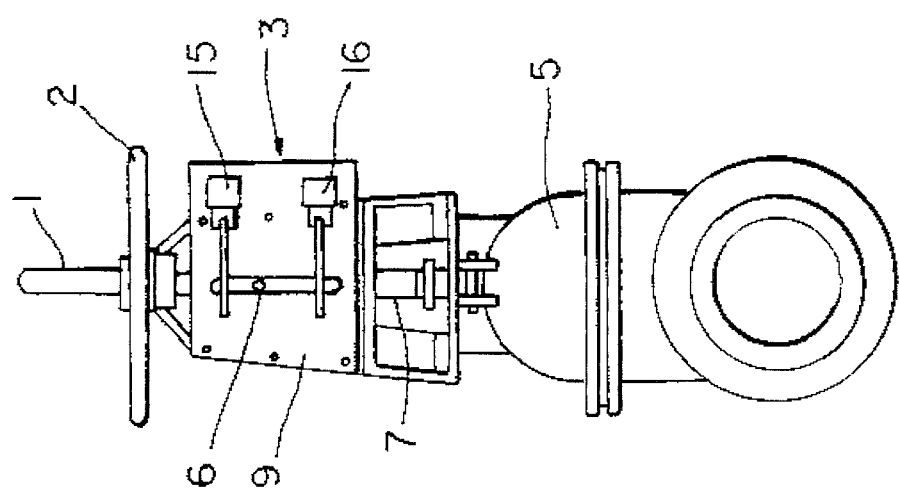
FIG. 1 is a front view of a linear actuation valve with the device of this invention for indicating valve operating state.

FIGS. 1 and 2 show a linear operating valve (5) with a device (3) fitted on top of it, below the hand wheel (2) that operates the stem (1) of the valve (5).

Figure 4:
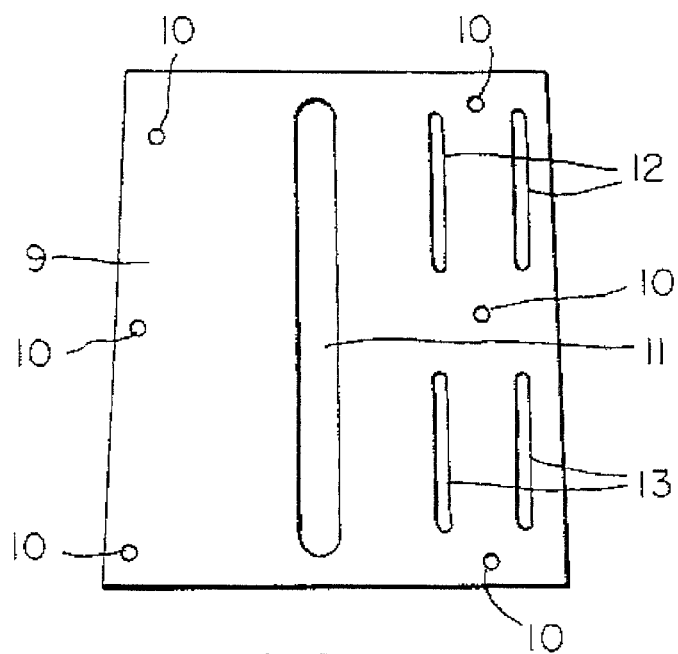
FIG. 4 is a front view of the front plate of the device of this invention.
Figure 5:
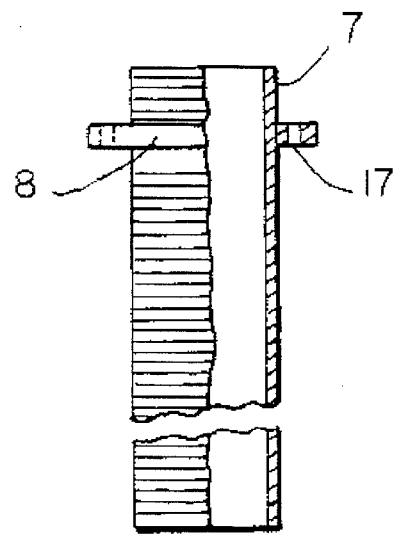
FIG. 5 is a front view of the threaded sleeve, the right hand side of the drawing showing a section and the left hand side an elevational view.
Figure 6A:
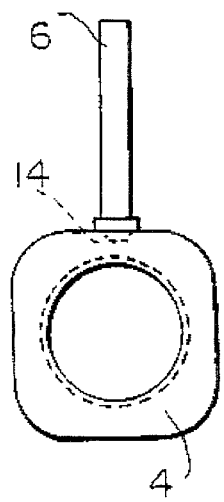
FIGS. 6a and 6b are a front view and a side view, respectively of the follower and the follower stem.
Figure 6B:

The device (3) for indicating the operating state of a linear actuation valve consists of a front plate (9), shown in greater detail in FIG. 4, an externally threaded sleeve (7) shown in greater detail in FIG. 5, a part (4) hereinafter referred to as the follower nut, a follower stem (6) attached to the follower nut (4) as can be more easily seen in FIGS. 6A and 6B, and finally two sensors (15) and (16).

The threaded sleeve (7) slips easily over the stem (1) in that the inside diameter of the sleeve is bigger than outside diameter of the stem (1) of the linear actuation valve (5), thus enabling said stem (1) to enter the sleeve with a clearence, without damaging the threads of said stem.

The threaded sleeve (7) is fixed to the hub of the hand wheel so as to rotate together with it. In this embodiment the threaded sleeve is fitted to the bushing of the hub of the wheel (2) by means of bolts (not shown) extending through holes (17) in a collar (8) secured to the sleeve (7). It should be pointed out that other methods may be used for fitting the threaded sleeve (7) to the wheel (2).

The follower nut (4) is screwed on to threaded sleeve (7) and its follower stem (6) has one of its ends fitted to the follower nut (4) so the stem (6) is perpendicular to threaded sleeve (7). In this embodiment the stem end is threaded so as to be screwed into a threaded hole (14) in the follower nut (4), though other ways of fixing the follower stem (6) to the follower nut (4) may be adopted.

FIG. 2 is a side view of linear actuation valve (5) and of the device (3) and shows in greater detail the threaded sleeve (7), the follower nut (4) and follower stem (6).

The front plate (9) of device (3) has an oblong slot (11) in which the follower stem (6) slides, and has two other groups of slots (12) and (13) intended to enable sensors (15) and (16) to be mounted on the plate (9). The front plate (9) has also holes (10) intended for fixing it to bonnet of a valve such as valve (5) shown.

The way in which device (3) functions to indicate the operating state of a linear actuation valve (5) is quite simple. When the hand wheel (2) is turned to open or to shut the linear actuation valve (5), threaded sleeve (7) turns together with the rotating hand wheel (2) since it is joined to it. The follower nut (4) is driven by the rotating hand wheel (2), as is the follower stem (6) joined to the follower nut (4). However, since the follower stem (6) passes through the oblong slot (11) in the front plate (9), rotation of the assembly of follower nut (4) and follower stem (6) with the rotating hand wheel (2) is prevented by the front plate (9) as the follower stem (6) contacts either edge of the slot (11).

Being thus prevented from turning, the follower nut (4) is obliged to travel up or down within the threaded sleeve (7) depending on whichever way the hand wheel (2) is being turned to open or to shut the linear actuation valve (5).

In following the up or down travel of the follower nut (4), the follower stem (6) approaches sensors (15) or (16) whenever linear actuation valve (5) approaches the fully open or fully shut state. The sensors (15) and (16) are fitted to the front plate (9), by means of groups of slots (12) and (13). These groups of slots (12) and (13) are so designed as to enable the sensors (15) and (16) to be assembled at spots that are adjustable to be sufficiently close to follower stem (6) when the latter reaches the limits of its travel, that is topmost and bottommost limits, as the valve becomes fully open or fully shut.

According to the type of sensor employed it may be necessary to fit them in such a way that the follower stem (6) actually touches them.

Hence, when the follower stem reaches either end of its travel, the sensors (15) and (16) perceive this, and send a signal to some remote panel to show that the associated valve has become completely open or shut, as the case may be.

The sensors (15) and (16) may be of various kinds, for example mechanically operated ones that operate by contact with the follower stem (6), or electronical sensors where no kind of physical contact is needed, to give but two examples.

The linear actuation valve operating device described and claimed herein is quite easy to manufacture, since the materials and parts needed for it are easily found on the market. Besides, the device performs outstandingly, and no specialized staff are needed to install it or to maintain it.

The pitch of the threads on the shaft (1) may be the same as that of the external threads on the sleeve (7), but may instead be greater or smaller than it if reduction or magnification of the axial movement of the follower stem (6) relative to that of the valve shutter is required.

I claim:

1. A device for indicating the operating state of a linear actuation valve having a hand wheel operatively connected to a valve stem, said device comprising an externally threaded sleeve disposed on said stem, connecting means connecting said sleeve to said hand wheel for rotation therewith, a follower nut screwed onto said sleeve, guide means for preventing rotation of said nut during rotation of said threaded shaft, and sensor means mounted on said valve for sensing longitudinal movement of said nut in opposite directions along said threaded sleeve upon rotation of said threaded sleeve in opposite directions respectively.

2. A device as set forth in claim 1, wherein said connecting means is comprised of an annular collar mounted on said threaded sleeve and having holes for attachment bolts to secure said collar to said hand wheel.

3. A device as set forth in claim 1, wherein said guide means is comprised of a follower stem fixed to said follower nut and extending perpendicularly to an axis of rotation of said threaded sleeve on which said follower nut is mounted and a plate mounted on said valve and having an elongated slot therein parallel to said threaded sleeve through which said stem extends.

4. A device as set forth in claim 3, wherein said valve includes a bonnet and wherein said plate is secured to said bonnet.

5. A device as set forth in claim 3, wherein said plate is provided with mounting slots for said sensors to adjustably locate said sensors along said threaded sleeve for operative interaction with said follower stem to indicate an open state and a closed state of said valve, respectively.

* * * * *